Patented Dec. 12, 1950

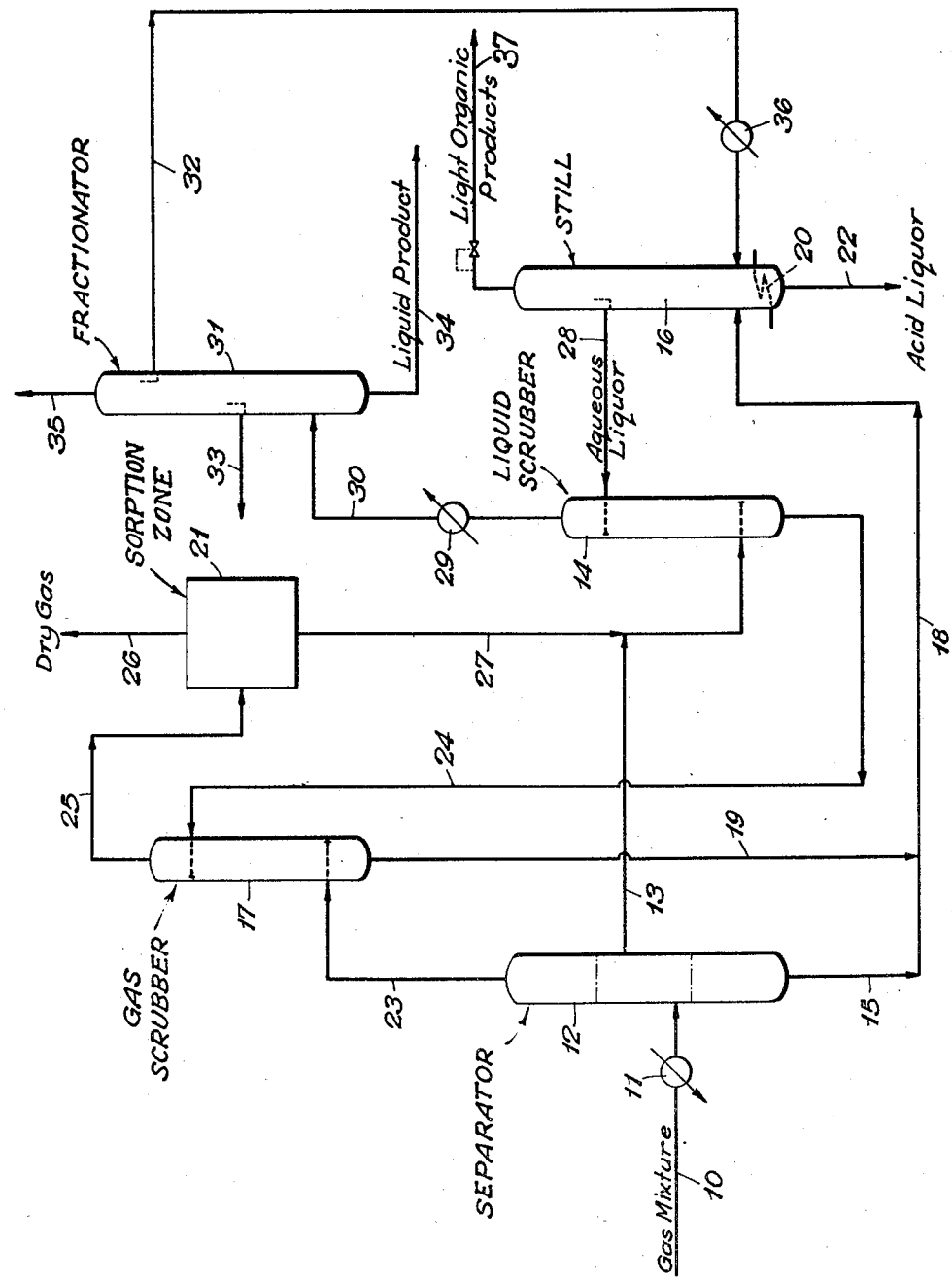

2,533,675

UNITED STATES PATENT OFFICE 2,533,675

RECOVERY OF OXYGENATED COMPOUNDS AND HYDROCARBONS FROM MIXTURES THEREOF

Robert F. Marschner, Homewood, Ill., assignor to Standard Oil Company, Chicago, Ill., a corporation of Indiana Application October 30, 1945, Serial No. 625,519

4 Claims. (Cl. 260—450)

REISSUED
NOV 27 1951
RE 23433

This invention relates to the recovery of generically different types of components from a gasiform stream of reaction products. More particularly the invention relates to an improved combination of synthesizing hydrocarbons and their oxygenated compounds from mixtures of hydrogen and carbon monoxide and of recovering the components of such synthesis products.

In the conversion of hydrogen and carbon monoxide with a synthesis catalyst to produce hydrocarbons having more than one carbon atom to the molecule, a mixture of generically different types of components is produced, including organic oxygenated compounds and hydrocarbons. A substantial proportion of the synthesis product comprises organic oxygenated compounds and these appear in the produced hydrocarbon liquids, in the water of reaction, and in the gas streams beyond the liquid product recovery.

It is an object of this invention to effect recovery of the reaction products in a plurality of integrated steps. It is a further object of this invention to recover separately generically different types of components from a reaction product stream including water. Another object of the invention is to provide a system wherein fractions of the generically different components are utilized in the recovery of additional quantities of dissimilar components from the hydrocarbon synthesis product. Still another object is to provide a method and means for effecting optimum recovery of synthesis products in an efficient and expeditious manner. These and additional objects will become apparent as the description proceeds.

In its broader aspects the objects of this invention are attained by cooling an effluent stream at reaction pressure to a temperature within the range of between about 50 and 250° F. and forming two liquid phases in a separator which are withdrawn separately, while the uncondensed stream of rich gas passes to a gas scrubber. The two liquid phases formed in the separator are a lower water phase, including condensible organic oxygenated compounds, and an upper hydrocarbon liquid phase. If desired, demulsifying agents can be used to enhance the phase separation in the separator.

At least a fraction of the total effluent stream from the reactor can be diverted to a condenser wherein a partial condensation of the product water is effected. A substantial proportion of the recoverable organic oxygenated compounds is found in this condensed water which is recovered from a primary separator, the water layer comprising between about 2 and about 20% or more of organic oxygenated compounds. These compounds have been identified as including among others: formaldehyde, acetaldehyde, acetone, methyl ethyl ketone and methyl, ethyl, n-propyl and n-butyl alcohols.

The uncondensed stream of rich gas from the product separator is scrubbed under pressure with liquid wash water which is then added to the liquid product water phase. The combined water phases are distilled to give a light organic distillate, an aqueous distillate including organic oxygenated compounds and a residue or acid liquor which is withdrawn from the system. The washed rich gas is passed into a sorption zone wherein a dry gas fraction and a hydrocarbon fraction plus residual organic oxygenated compounds are separated. The sorption may be effected by means of a solid adsorbent or by means of a liquid absorbent. The lean gas is removed from the sorption zone and can be recycled to the reforming or to the synthesis step with or without separation of carbon dioxide as required.

The sorbed hydrocarbons and organic oxygenated compounds and the hydrocarbons recovered from the primary separator can be supplied to a liquid scrubber or extractor where organic oxygenated compounds are removed from the hydrocarbon constituents and the hydrocarbons are removed from the aqueous product fraction. The enriched aqueous oxygenated compound fraction can be withdrawn from the scrubber or extractor and supplied as the wash liquid in the gas scrubber. In the gas scrubbing operation the bulk of organic oxygenated compounds are removed from the rich gas and the light hydrocarbons are stripped from the aqueous liquor. A hydrocarbon fraction substantially free of oxygenated compounds is withdrawn from the extractor to be fractionated and/or treated as desired. The recovered organic oxygenated compounds from the aqueous product fraction still can be separated into relatively pure streams by fractionation or the like.

In the sorption zone the effective agent may be charcoal, silica gel, alumina or other adsorptive material. The hydrocarbons adsorbed on these active agents can be removed by stripping or the like. Alternatively the washed, rich gas supplied to the sorption zone can be freed of liquid hydrocarbons and organic oxygenated compounds by absorption with a suitable liquid, such for example as a liquid hydrocarbon product fraction. Alternatively organic oxygenated compounds in the water phase can be recovered by distilling the aqueous mixture of oxygenated compounds and water in the presence of added $C_5$—$C_7$ hydrocarbons boiling between about 90 and 210° F. A mixture corresponding to the ternary azeotrope of hydrocarbons, oxygenated compounds, and a minor proportion of water can be continuously removed as a constant-boiling mixture. The constituents of the azeotrope can then be recovered separately in substantially pure form.

The invention will be more clearly understood from the following detailed description of a specific example read in conjunction with the accompanying diagrammatic flow sheet which forms a part of this specification and which represents a schematic flow diagram of my improved system.

Natural gas from wells, which normally comprises essentially methane as its hydrocarbon constituent, is the preferred ultimate source of raw material for the process, although it should be understood that many features of the process are also applicable to feed gases derived directly or indirectly from other sources, such as coal, shale and carbonaceous material in general. It is also contemplated that suitable raw material either as hydrocarbon gases or as mixtures of hydrogen or carbon monoxide can be recovered from petroleum refining operations. The feed gases can, for example, be derived by the controlled regeneration of solid conversion catalyst having carbonaceous deposits thereon to produce carbon monoxide mixtures directly. In some instances, it will be necessary to alter the ratio of hydrogen to carbon monoxide, however, to obtain the optimum feed gas ratios.

The hydrocarbon gas is reformed to produce the desired hydrogen to carbon monoxide ratio which can be in the approximate ratio of between 0.5 to 1 and 3 to 1. A feed gas mixture containing hydrogen and carbon monoxide in these ratios can be prepared by reforming natural gas either with oxygen, water, carbon dioxide, or admixtures of any of these at a temperature of between about 1400 and about 1800° F. and a pressure of between about atmospheric and 400 pounds per square inch thermally or over known types of catalyst. A preferred catalyst is a group VIII metal or metal oxides. It can be supported on a carrier, such as Super Filtrol, Celite, silica gel, clay, alumina, or the like. Nickel on alumina is particularly useful at a temperature of about 1600° F. The hydrogen-carbon monoxide mixture is withdrawn from the reformer and introduced into the hydrocarbon synthesis reactor at a pressure substantially that of the conversion step which may be about 300 pounds gauge.

The feed gas together with recycle gases are supplied to a cynthesis reactor. The reactor may be of the fixed, moving bed or fluidized type, and should be provided with means for abstracting the heat of synthesis to maintain the synthesis temperature within a relatively narrow range. Fixed beds of the tubular, chamber, annulus, shelf or divided types can be used, but a reactor of the so-called fluidized catalyst type, i. e., one designed to maintain finely divided catalyst in dense suspended turbulent or liquid-like phase, is particularly useful for this purpose. The reaction can be conducted under a pressure within the approximate range of between about 50 and about 500 pounds or more per square inch and at a temperature within the approximate range of between about 350 and 850° F., for example, 610° F. with an iron-type catalyst at a pressure of about 300 pounds per square inch. A space velocity within the approximate range of between about 100 and 5000, or more, volumes of gas per volume of catalyst within the reactor are contemplated. The gas volumes are measured at 60° F. and under atmospheric pressure and the catalyst volume is based upon the fluidized catalyst within the synthesis reactor. The desired temperature level can be maintained by cooling tubes, by abstracting heat from the catalyst outside the reactor and recycling the cooled catalyst, by injecting cooling fluid directly into the reaction space, by recycling gaseous reaction products or liquid reaction products, etc.

A suitable catalyst for the synthesis is preferably one or more group VIII metals or metal oxides, for example, nickel, iron, or cobalt. A particularly useful catalyst is an iron-type catalyst similar to that used in ammonia synthesis. Catalysts outside group VIII can also be used. In some instances it is desirable to include promoters comprising metals or metal compounds such as the oxides of aluminum, cerium, magnesium, manganese, potassium, thorium, titanium, uranium, zinc, zirconium, and the like. If desired, the catalyst can be supported on a suitable carrier such as clay, silica gel, alumina, Super Filtrol, Celite, etc.

For use in a fluidized system the catalyst particles are of the order of 2 to 200 microns or larger, preferably 20 to 100 microns in particle size. With vertical gasiform fluid velocities of the order of about 0.5 to 5, preferably between about 1 and 4, for example, about 2 feet per second, a liquid-like dense phase of catalyst is obtained in which the bulk density is between about 30 and about 90 percent, preferably between about 40 and 80, e. g. about 60 percent of the density of the settled catalyst material within the reactor.

The absolute density of the catalyst particles employed decreases with the on-stream time and it is contemplated that the vertical gasiform velocities can be diminished and/or the quantity of catalyst reduced to maintain the desired fluidized bulk density of catalyst within the reactor. In any event the vertical velocity of the gasiform fluids is regulated so as to produce a turbulent suspension of catalyst material within the reactor.

The catalyst material is continuously settled from the reaction products within the reactor, any residual catalyst in the gaseous product being removable by water scrubbing, cyclone separators, or the like. However, since the reaction system is not a feature of the present invention, it has not been illustrated and further details have not been described.

The reaction product stream in line 10 is cooled in partial condenser 11 and the cooled mixture introduced into primary separator 12 wherein phase separation is effected. A liquid hydrocarbon product stream containing dissolved gas, organic oxygenated compounds and even water is withdrawn from the primary separator 12 via line 13 and introduced into the liquid scrubber 14.

Liquid water or primary aqueous liquor containing dissolved condensable oxygenated compounds plus traces of hydrocarbons are withdrawn from the primary separator 12 via line 15 and introduced into the water still 16 via line 18, together with rich scrubber water in line 19, which includes methyl alcohol and other oxygenated compounds. The oxygenated compounds will comprise between about 10 and about 70 mol percent of the aqueous phase introduced into the still 16. The still 16 may be operated at a pressure between about atmospheric and 100 pounds per square inch, and a pressure reducing valve (not shown) can be provided on line 18. The rich water can be introduced into the still 16 at a temperature of about 150° F., and a suitable heat source 20 can be provided near the base of the still 16. Alternatively, open steam can be introduced into still 16 to supply heat thereto. The overhead from the still 16 can be withdrawn by line 37 for recovery of light organic products. An acid liquor fraction can be withdrawn from the still 16 via line 22, the lean water withdrawn representing the net production of reaction water. When it is desired to employ azeotropic distillation, a $C_5$—$C_7$ fraction can be heated in 36 and introduced into the still 16 via line 32. This hydrocarbon fraction can suitably be a product fraction recovered from the hydrocarbon product in fractionator 31 via line 32. In that event, the constant boiling mixture can be withdrawn overhead from the still 16 via line 37.

An aqueous liquor including dissolved oxygenated compounds is withdrawn from an intermediate point in still 16 and supplied as the scrubber liquid via line 28 to the scrubber 14. If desired, a separator can be provided on line 28 to remove a lower layer of the aqueous liquor, which can be recycled in still 16. The aqueous liquor, which is recovered from still 16 is introduced into the liquid scrubber or extractor 14, and countercurrently contacted with hydrocarbons and oxygenated compounds supplied by lines 13 and 27. In the extractor 14 oxygenated compounds are removed from the hydrocarbons by the aqueous phase and hydrocarbons substantially free of light oxygenated compounds are recovered via line 30.

The hydrocarbons withdrawn from the liquid scrubber 14 via line 30 and passed through heater or exchanger 29 are substantially free of light organic oxygenated compounds. This vapor fraction can be introduced into the fractionator 31 and a plurality of hydrocarbon products recovered. The hydrocarbon product can be recovered as a Diesel fuel and wax fraction via line 34, a gasoline and lighter hydrocarbon fraction via lines 35 and 32, and a gas oil fraction via line 33 which can be employed in the sorption system 21 when the recovery of hydrocarbons from the rich gas is by absorption. The rich absorber liquid can be withdrawn from sorption zone 21 and fractionated in a separate still (not shown) or recycled to the fractionator system 31 directly or via the scrubber 14.

The rich gas from primary separator 12 is introduced via line 23 at a low point into the gas scrubber 17. Within scrubber 17 water soluble synthesis products are recovered by contacting with an enriched aqueous liquor introduced via line 24 from the liquid scrubber 14. The further enriched liquor is withdrawn from the scrubber 17 via line 19 and processed as herein described.

The washed rich gas removed from the gas scrubber 17 via line 25 is introduced into the sorption zone 21. Within sorption zone 21 the hydrocarbon constituents are recovered from the rich gas and a dry gas is separated via line 26. The recovery of hydrocarbons within the sorption zone 21 can be effected by means of a solid adsorbent or a liquid absorbent.

The solid adsorbents can be selected from a number of well known materials useful for this purpose and the hydrocarbons can be released from such adsorbents by stripping, for example with steam. When steam is used, the adsorbent effluent can be collected to produce two liquid phases, thereby effecting separation of the hydrocarbon and the condensed water. When a liquid absorbent is employed in the recovery of hydrocarbons from the rich gas within the sorption zone 21, a suitable absorbent medium is a gas oil fraction recovered from the hydrocarbon product in fractionator 31 via line 33 and the hydrocarbons recovered therefrom by distillation.

The residual gases from the sorption step are rich in hydrogen but may contain low molecular weight hydrocarbons and carbon dioxide. If desired these gases can be passed thru a second sorption step for the recovery of residual hydrocarbons before being vented from the system via line 26. Alternatively, all or a portion of the gases can be recycled to the hydrocarbon reformer or to the synthesis reactor. It is also contemplated that the $CO_2$ can be removed from the tail gases and supplied to the reformer and any unconverted feed recycled to the synthesis reactor.

The rich liquids from the sorber 21 are withdrawn via line 27 and commingled with the hydrocarbon product fraction withdrawn by line 13 from the primary separator 12. The commingled stream is then introduced into liquid scrubber 14 wherein the hydrocarbons are contacted in the liquid phase with aqueous liquor introduced by line 28 from the still 16.

The liquid product from the liquid scrubber 14 can be fractionated in 31 to produce the desired cuts such as Diesel fuel, wax, gasoline, etc. These product fractions can be recovered via lines 32, 33, 34 and 35. In the embodiment illustrated, a $C_5$—$C_7$ cut suitable for use in the azeotropic distillation of the oxygenated compounds from the water phases can be recovered by line 32, heated in 36 and supplied to still 16. An absorber oil fraction can be recovered by line 33 and supplied to sorber 21. The rich absorber oil can be returned to the fractionator 31 via the liquid scrubber 14. Alternatively, a separate stripper system can be provided for the rich absorber oil, by-passing the liquid scrubber 14.

If desired, the hydrocarbon product fractions in lines 13 and 27 from separator 12 and sorber 21, which includes oil-soluble oxygenated compounds, can be catalytically finished. For example, the product fraction can be heated to a temperature of between about 750 and 800° F. and contacted with a cracking catalyst to convert the oxygenated compounds to olefins. Such an operation does not effect any reforming or cracking and the octane number improvement results from the conversion of the oxygenated compounds to olefins. However, this catalytic finishing can be conducted at a higher temperature of the order of between 925° F. and about 975° F. which not only converts the oxygenated compounds to hydrocarbons but also effects reforming of the gasoline hydrocarbons and cracking of the heavier hydrocarbon product to produce a material of improved anti-knock and of lower molecular weight.

It is also contemplated that instead of employing a single primary separator, I may provide a means for cooling the reaction product in stages and separation of phases between the cooling stages. Thus, the product stream can be initially cooled to a temperature of about 450° F. to effect recovery of heavy hydrocarbon products and waxes. The remainder of the gasiform product can then be further cooled to a temperature of about 20 to 100° F. below the boiling point of the water at the partial pressure of water existing in the product stream. A liquid water fraction can then be recovered which is substantially free of any condensable oxygenated compounds. Further cooling of the gasiform product stream will permit the separation of a concentrated solution of oxygenated compounds as the water phase. When fractional condensation is employed, the pure water fraction can be used in the two-phase absorber 14, the oxygenated compounds being subsequently removed and the water discarded.

Although fractionation has been described as the means of recovering the oxygenated compounds present in the aqueous phase from separator 12 and gas scrubber 17, it is to be understood that other means can be employed. The stream of oxygenated compounds and water in lines 15 and 19 can be treated by any method to recover the separate components as desired. Other means may be used for recovery of the oxygenated compounds in the aqueous phase such as extraction with a suitable solvent or conversion of the alcohols present to the more volatile aldehydes and ketones and subsequent recovery of all aldehydes and ketones present by stripping or by the addition of sodium bisulfite to precipitate the compounds formed with regeneration of the aldehydes and ketones by the addition of acid.

From the above description it will be apparent that my invention provides a novel method and means for recovery of products from a reaction stream such as from a hydrocarbon synthesis and an integrated system for attaining the objects of my invention. However, to simplify the description, valves, pumps and similar control means have not always been included. It is also contemplated that the exothermic heat of the reaction can be utilized in supplying heat to the stripping and fractionation step.

It is to be understood that although my invention has been described with reference to an illustrative example, the invention is not restricted thereto and that modifications by those skilled in the art are contemplated without departing from the spirit of the invention defined by the appended claims.

What I claim is:

1. In a process for separately recovering generically different types of components from a mixture of hydrocarbons, organic oxygenated compounds, and water, obtained by catalytically hydrogenating carbon monoxide, cooling the resulting vaporous mixture and condensing normally liquid components therefrom, and separating from the cooled mixture a gas phase, a first liquid hydrocarbon phase, and a first aqueous phase, all of said phases containing organic oxygenated compounds, the improvement which comprises fractionally distilling said first aqueous phase, and separating therefrom an overhead fraction consisting predominantly of low-boiling organic oxygenated compounds substantially free from organic acids, a bottom aqueous fraction containing organic acids substantially free from other organic oxygenated compounds, and an intermediate aqueous fraction containing hydrocarbon-soluble substances and higher-boiling water-soluble organic oxygenated compounds; contacting said first liquid hydrocarbon phase with said intermediate aqueous fraction; and stratifying and withdrawing therefrom a second liquid hydrocarbon phase containing a diminished proportion of organic oxygenated compounds and a second aqueous phase containing a diminished proportion of hydrocarbon-soluble substances.

2. The process of claim 1 wherein the fractional distillation of said first aqueous phase is effected in the presence of a $C_5$—$C_7$ hydrocarbon mixture, whereby said low-boiling organic oxygenated compounds are withdrawn overhead as an azeotropic mixture with said hydrocarbon mixture.

3. The process of claim 1 wherein said gas phase is subsequently contacted with said second aqueous phase containing a diminished proportion of hydrocarbon-soluble substances, whereby organic oxygenated compounds are removed from said gas phase into said second aqueous phase; and the resulting enriched aqueous phase is recycled to said first aqueous phase.

4. The process of claim 3 wherein said gas phase is subsequently contacted with a gas-oil fraction obtained by fractional distillation of said second liquid hydrocarbon phase, whereby hydrocarbons are removed from said gas phase; and the resulting enriched liquid hydrocarbon phase is recycled to said second liquid hydrocarbon phase.

ROBERT F. MARSCHNER.

REFERENCES CITED

The following references are of record in the file of this patent:

UNITED STATES PATENTS

| Number | Name | Date |
|---|---|---|
| 2,083,125 | Scheuble | June 8, 1937 |
| 2,216,549 | Deanesly | Oct. 1, 1940 |
| 2,259,951 | Eversole | Oct. 21, 1941 |
| 2,279,052 | Michael | Apr. 7, 1942 |
| 2,299,790 | Bludworth | Oct. 27, 1942 |
| 2,347,682 | Gunness | May 2, 1944 |